(12) United States Patent
Kawazu et al.

(10) Patent No.: US 9,958,600 B2
(45) Date of Patent: May 1, 2018

(54) LIGHT-SOURCE DEVICE AND DISPLAY APPARATUS

(71) Applicant: Sakai Display Products Corporation, Sakai-shi, Osaka (JP)

(72) Inventors: Yoshinari Kawazu, Sakai (JP); Atsushi Koumura, Sakai (JP); Yasuyuki Aikawa, Sakai (JP); Arimasa Sugimoto, Sakai (JP); Yoshihiro Murakami, Sakai (JP); Kazuhiko Negoro, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days. days.

(21) Appl. No.: 15/502,984

(22) PCT Filed: Sep. 12, 2014

(86) PCT No.: PCT/JP2014/074280
§ 371 (c)(1),
(2) Date: Feb. 9, 2017

(87) PCT Pub. No.: WO2016/038740
PCT Pub. Date: Mar. 17, 2016

(65) Prior Publication Data
US 2017/0227706 A1    Aug. 10, 2017

(51) Int. Cl.
*F21V 8/00* (2006.01)

(52) U.S. Cl.
CPC ......... *G02B 6/0088* (2013.01); *G02B 6/0068* (2013.01); *G02B 6/0091* (2013.01)

(58) Field of Classification Search
CPC ... G02B 6/0088; G02B 6/0068; G02B 6/0091
USPC ........................................ 362/632, 633, 634
See application file for complete search history.

(56) References Cited

U.S. PATENT DOCUMENTS

| | | | |
|---|---|---|---|
| 7,762,708 B2* | 7/2010 | Lee ................... | G02F 1/133605 362/632 |
| 8,665,389 B2* | 3/2014 | Son ...................... | G02B 6/0086 349/58 |
| 8,780,296 B2* | 7/2014 | Kim ................... | G02F 1/133608 349/65 |
| 9,798,076 B2* | 10/2017 | Matsumoto ............ | G02B 6/009 |

(Continued)

FOREIGN PATENT DOCUMENTS

| | | |
|---|---|---|
| JP | 2004-193002 A | 7/2004 |
| JP | 2007-232809 A | 9/2007 |

(Continued)

*Primary Examiner* — Laura Tso
(74) *Attorney, Agent, or Firm* — Bret E. Field; Bozicevic, Field & Francis LLP

(57) ABSTRACT

There are provided a light-source device which is capable of restraining deformation of side walls of a housing due to heat generated by the light emission of the light source, and a display apparatus. A light-source device is provided with a light guide plate which is placed on a bottom plate of a housing having an opening formed at one surface thereof, and a light source which is fixed to the housing and is arranged to face one end face of the light guide plate, and the bottom plate of the housing has a separation part that separates the bottom plate into a first portion in which the light source is disposed and a second portion in which the light source is not disposed.

7 Claims, 5 Drawing Sheets

(56) References Cited

U.S. PATENT DOCUMENTS

| | | | |
|---|---|---|---|
| 2008/0144337 A1* | 6/2008 | Li | G02B 6/0088 362/633 |
| 2010/0172154 A1* | 7/2010 | Takeuchi | G02F 1/133308 362/613 |
| 2010/0195350 A1* | 8/2010 | Schattinger | G09F 9/33 362/612 |
| 2011/0170315 A1 | 7/2011 | Chen | |
| 2011/0286235 A1 | 11/2011 | Tsai et al. | |
| 2011/0292315 A1 | 12/2011 | Bae et al. | |
| 2013/0128505 A1 | 5/2013 | Kuo et al. | |
| 2014/0063412 A1* | 3/2014 | Zhou | G02B 6/0088 349/65 |
| 2014/0204328 A1 | 7/2014 | Kikuchi | |
| 2015/0212261 A1 | 7/2015 | Masuda | |

FOREIGN PATENT DOCUMENTS

| | | |
|---|---|---|
| JP | 5048147 B1 | 10/2012 |
| JP | 2014-149386 A | 8/2014 |
| WO | WO2014024771 A1 | 2/2014 |

\* cited by examiner

LIGHT-SOURCE DEVICE AND DISPLAY APPARATUS

CROSS-REFERENCE TO RELATED APPLICATIONS

This application is the national phase under 35 U.S.C. § 371 of PCT International Application No. PCT/JP2014/074280 which has an International filing date of Sep. 12, 2014 and designated the United States of America.

FIELD

The present invention relates to a light-source device used as a backlight which irradiates a liquid crystal panel (display panel) with light, and a display apparatus including the light-source device.

BACKGROUND

A display apparatus including a liquid crystal panel as an image display unit is configured in such a manner that a backlight (light-source device) is disposed on a back side of the liquid crystal panel, and light emitted from the backlight is modulated and transmitted by the liquid crystal panel so as to display an image on a front surface of the liquid crystal panel. The backlight is broadly classified into a direct type and an edge light type, but in recent years, to reduce power consumption and thin a frame, the edge light type backlight is widely employed.

The edge light type backlight includes a light guide plate and a light source which are housed in a backlight chassis (housing) formed in a shallow bottom box shape of which one surface is open. The light guide plate is a plate made of a translucent resin, and is placed on a bottom plate of the housing. The light source is disposed along one side wall of the housing, and is disposed to face one end face of the light guide plate, so as to face the one end face of the light guide plate.

Peripheral edge parts of the light guide plate are covered over an appropriate width of the light guide plate together with the light source by a frame body fitted to edge parts of the housing, and light emitted from the light source enters into the light guide plate and progresses in the light guide plate while being diffused, and then the light is distributed and emitted throughout the entirety of one surface of the light guide plate which is exposed to an inside of the housing (for example, see Japanese Patent Laid-open Publication No. 2007-232809).

SUMMARY

However, the display apparatus described in Japanese Patent Laid-open Publication No. 2007-232809 has a problem that heat generated by the light emission of the light source is transmitted to another side walls of the housing which is opposite to the one side wall through the bottom plate thereof, to cause deformation such as warping or bending in the another side walls.

In consideration of the above-mentioned circumstances, it is an object of the present invention to provide a light-source device which is capable of restraining deformation of side walls of a housing due to heat generated by the light emission of the light source, and a display apparatus.

According to one aspect of the present invention, there is provided a light-source device including: a light guide plate which is placed on a bottom plate of a housing having an opening formed in one surface of the housing; and at least one light source which is fixed to the housing and is arranged to face one end face of the light guide plate, wherein the bottom plate of the housing has a separation part that separates the bottom plate into a first portion in which the at least one light source is disposed and a second portion in which the at least one light source is not disposed.

In the light-source device according to an embodiment, the bottom plate of the housing may be formed in a rectangular shape, the at least one light source may be disposed on one of four sides of the bottom plate, and the separation part may be a long hole which extends in a direction along the one of the four sides of the bottom plate.

In the light-source device according to an embodiment, the bottom plate of the housing may be formed in a rectangular shape, the at least one light source may be disposed on one of four sides of the bottom plate, and the separation part may be a long hole which extends along one of two diagonal lines of the bottom plate.

In the light-source device according to an embodiment, the bottom plate of the housing may be formed in a rectangular shape, two light-source groups may be disposed on two opposing sides of the bottom plate, respectively, each of the groups consists of the at least one light source, and the bottom plate of the housing may have two separation parts which may be long holes and extend along two diagonal lines of the bottom plate, respectively.

The light-source device according to an embodiment may include a cover part which is fixed to the bottom plate of the housing to cover the separation part.

In the light-source device according to an embodiment, a heat insulating member may be installed between the bottom plate of the housing and the cover part.

According to another aspect of the present invention, there is provided a display apparatus including: the above light-source device; and a display panel which covers the opening of the light-source device, wherein light emitted from the at least one light source is irradiated to a rear surface of the display panel to display an image on a front surface of the display panel.

According to the present invention, it is possible to restrain deformation of the side walls of the housing due to heat generated by the light emission of the light source.

The above and further objects and features will more fully be apparent from the following detailed description with accompanying drawings.

DETAILED DESCRIPTION

Embodiment 1

Figure 1:
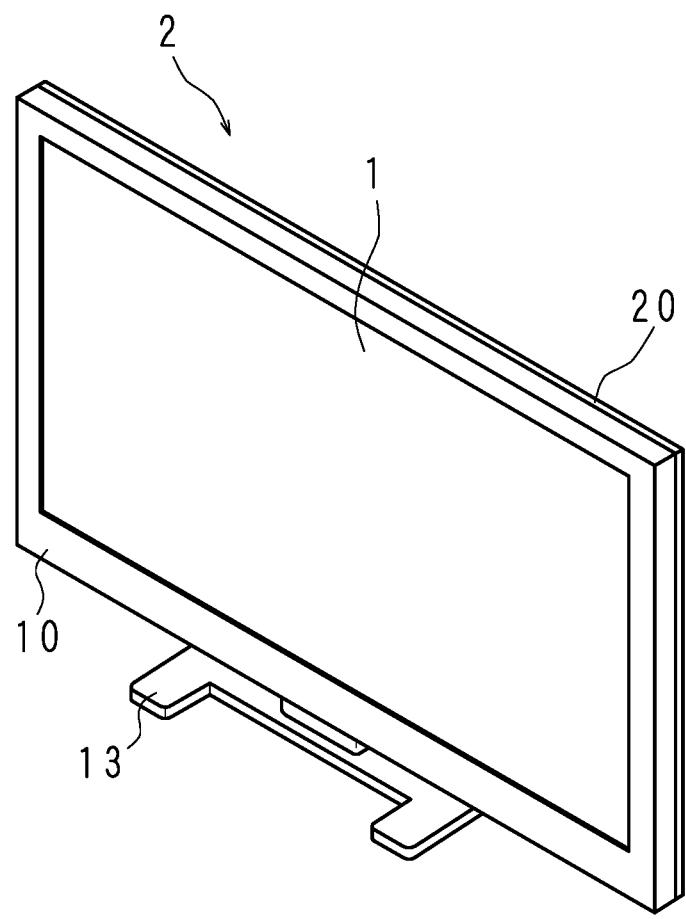
FIG. 1 is a perspective view schematically illustrating an appearance of a front side of a display apparatus according to Embodiment 1.

Hereinafter, the present invention will be described in detail with reference to the accompanying drawings illustrating embodiments thereof. FIG. 1 is a perspective view schematically illustrating an appearance of a front side of a display apparatus according to Embodiment 1. The illustrated display apparatus includes a liquid crystal panel (display panel) 1 formed in a rectangular plate shape for displaying an image, and a backlight 2 which irradiates the liquid crystal panel 1 with light. In the following description, a side of an image display surface of the liquid crystal panel 1 is referred to as a front side, and another side which is opposite to the front side is referred to as a back side.

A frame body 10 is assembled in the liquid crystal panel 1 so as to rim peripheral edges of a front surface (the image display surface) over an appropriate width. FIG. 1 illustrates only the image display surface of the liquid crystal panel 1 exposed in the frame of the frame body 10. The backlight 2 is assembled on the back side of the liquid crystal panel 1.

The display apparatus further includes a stand 13 so as to be supported on an appropriate placing surface through the stand 13, and as illustrated in FIG. 1, is used while the image display surface of the liquid crystal panel 1 is maintained in a vertical position. Upper and lower used in the following description correspond to the upper and lower in the above-described used state, and similarly, right and left correspond to the right and left in the used state when facing the front side.

Figure 2:
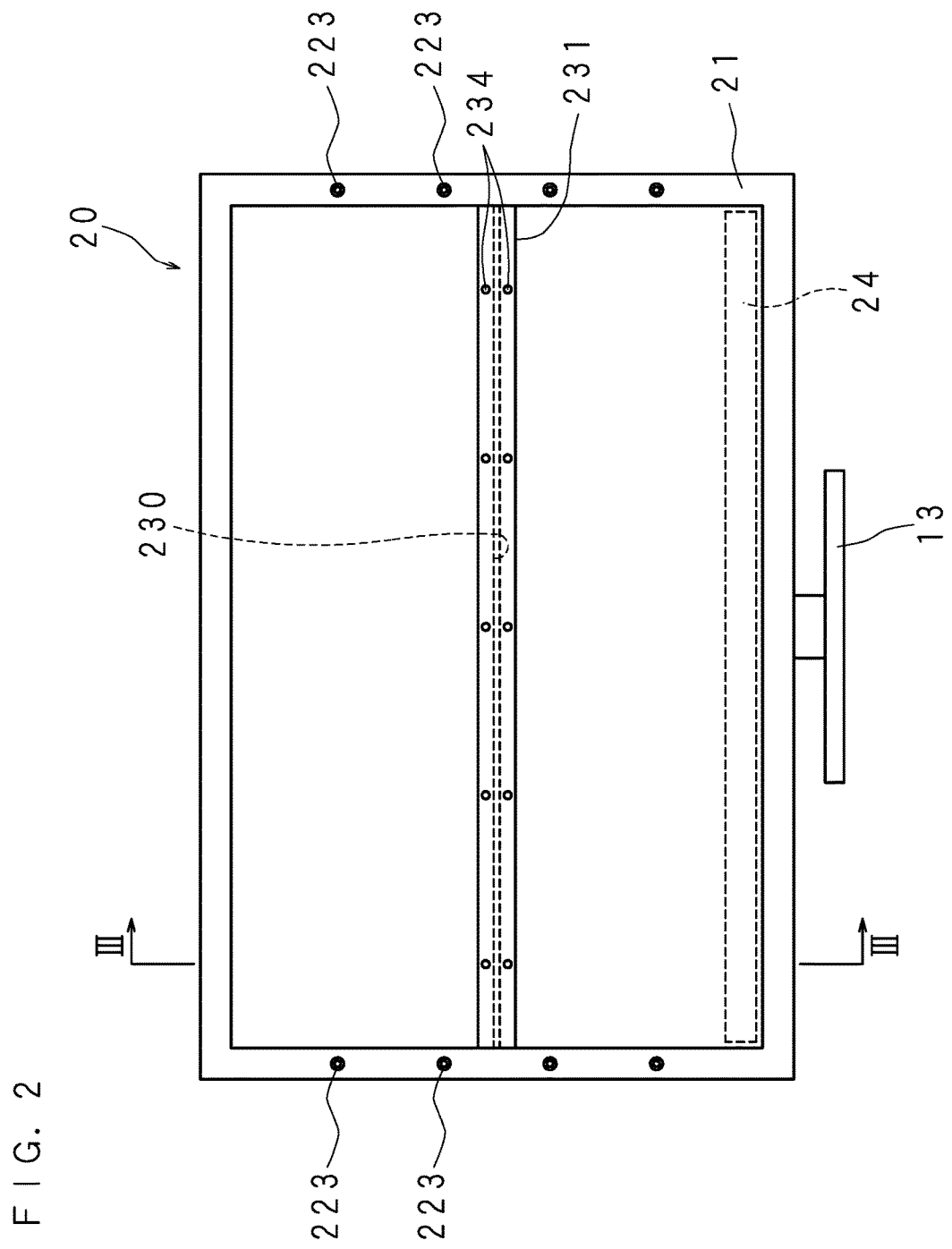
FIG. 2 is a rear view schematically illustrating the appearance of the display apparatus according to Embodiment 1.
Figure 3:
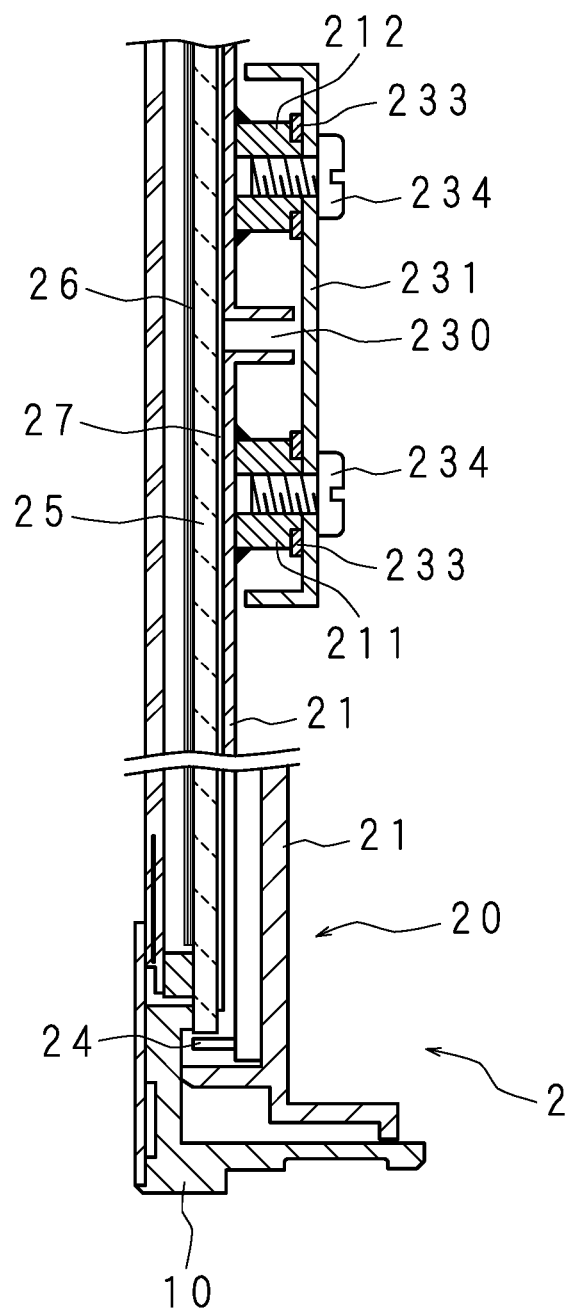
FIG. 3 is a longitudinal sectional view taken on line III-III of FIG. 2.

FIG. 2 is a rear view schematically illustrating the appearance of the display apparatus according to Embodiment 1, and FIG. 3 is a longitudinal sectional view taken on line III-III of FIG. 2. As illustrated in FIG. 3, the backlight 2 includes a backlight chassis (housing) 20 formed in a shallow bottom box shape, a light guide plate 25 placed on a bottom plate 21 of the backlight chassis 20, and a light source 24 housed in the backlight chassis 20.

The light guide plate 25 is a plate made of a translucent resin, and is formed in a rectangular shape slightly smaller than the backlight chassis 20. On the light guide plate 25, a reflection sheet 27 is laminated over an entire surface of the back surface, and an optical sheet 26 is laminated over an entire surface of the front surface.

The light source 24 includes an elongated rectangular substrate, and a plurality of light emitting diodes (LEDs) arranged on one surface of the substrate in a longitudinal direction. The light source 24 is disposed along a lower side of the backlight chassis 20 as illustrated in FIG. 2, while a side thereof in which the LEDs are arranged face an end face of the light guide plate 25.

As illustrated in FIG. 2, the bottom plate 21 of the backlight chassis 20 is a rectangular shape, and includes a separation part 230 that separates the bottom plate 21 into a first portion in which the light source 24 is disposed and a second portion in which the light source 24 is not disposed. The separation part 230 of Embodiment 1 is provided at a substantially central portion in a vertical direction of the bottom plate 21, and is a long hole which extends over a substantial entire length in a direction along one side (the lower side) in which the light source 24 is disposed, that is, in a horizontal direction.

As illustrated in FIG. 2, the long hole 230 as the separation part is covered by a cover part 231 over the entire length thereof. As illustrated in FIG. 3, the cover part 231 is an angle member having a wide U-shaped cross section, is bridged between bosses 211 and 212 vertically erected from an outer surface of the bottom plate 21 while an opening thereof faces the bottom plate 21, and is fixed to the respective bosses 211 and 212 by screwing screws 234 and 234 thereto. A plurality of the bosses 211 and 212 are respectively arranged along end edges opposing each other of the separation part 230, and as illustrated in FIG. 2, screwing by the screws 234 is performed at the plurality of locations corresponding to the positions of the respective bosses 211 and 212.

As illustrated in FIG. 3, washers 233 are installed between the bosses 211 and 212 and the cover part 231. The washer 233 is made of a material having heat insulating properties such as ceramics and porous silicone rubber, and functions as a heat insulating member for preventing heat transfer between the bottom plate 21 on which the bosses 211 and 212 are erected and the cover part 231.

The display apparatus is configured by fitting the frame body 10 to the above-described backlight 2, and fixing right and left end edges of the backlight chassis 20 to the frame body 10 by screws 223.

In the display apparatus configured as described above, light emitted from the light source 24 enters into one end face of the light guide plate 25, and irradiates the back surface of the liquid crystal panel 1 via diffusion by the light guide plate 25 and the optical sheet 26. The light is modulated and transmitted by the liquid crystal panel 1 to display an image on the front surface thereof.

According to the present embodiment, since the bottom plate 21 of the backlight chassis 20 has the separation part 230 that separates the bottom plate 21 into the first portion in which the light source 24 is disposed and the second portion in which the light source 24 is not disposed, it is possible to prevent heat generated by the light emission of the light source 24 from being transferred to the second portion through the bottom plate 21. Thereby, a thermal expansion in the side walls of the second portion may be smaller than ever before, thus to suppress deformation of the side walls of the backlight chassis 20.

According to the present embodiment, since the bottom plate 21 of the backlight chassis 20 is reinforced by covering the separation part 230 with the cover part 231, it is possible to compensate for lack of strength in the backlight chassis 20 due to the provision of the separation part 230.

According to the present embodiment, since the washers 233 are installed between the cover part 231 and the bosses 211 and 212 as the heat insulating member, it is possible to prevent the heat generated by the light emission of the light source 24 from being transferred to the second portion through the cover part 231.

Embodiment 2

Figure 4:
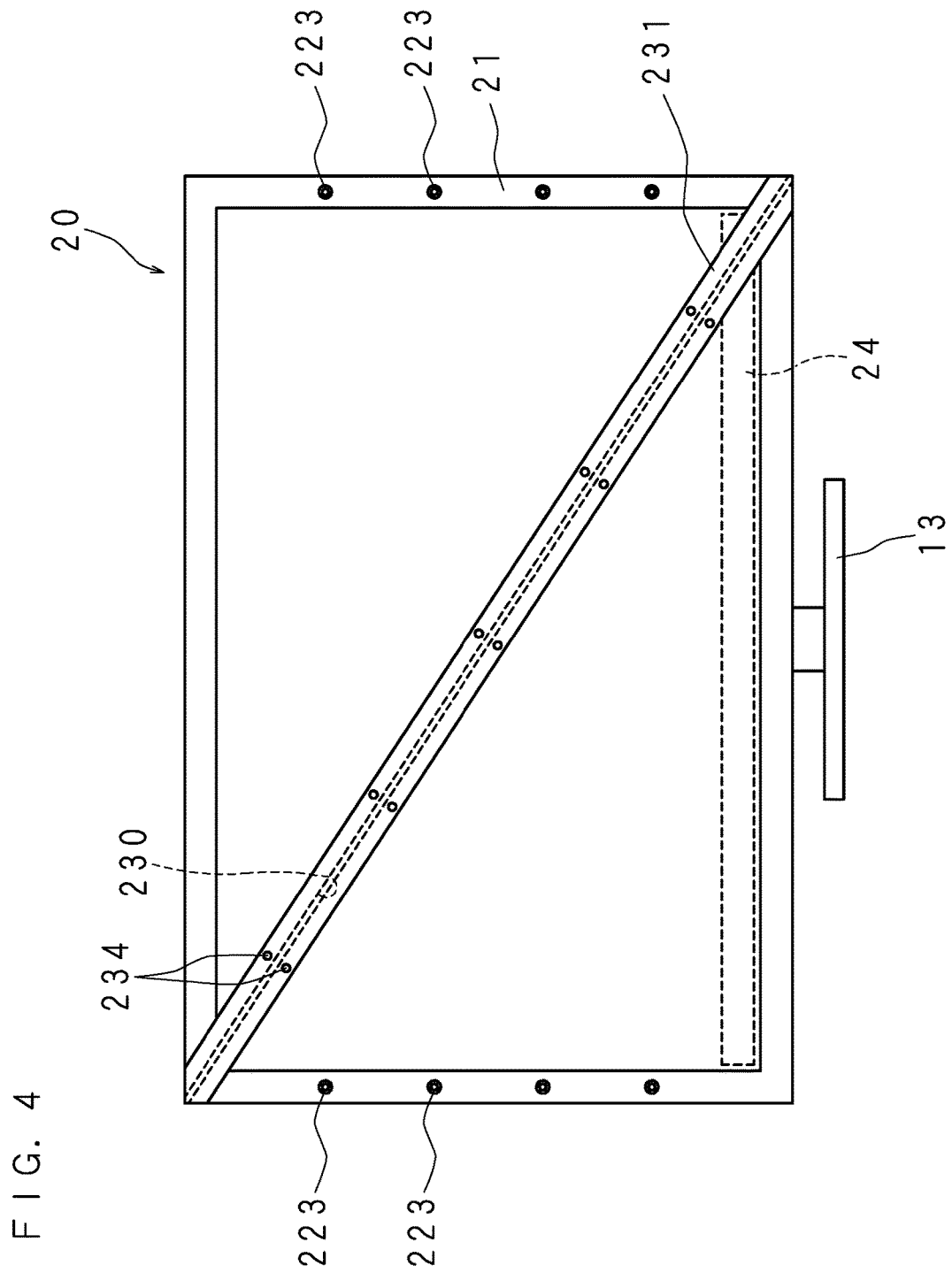
FIG. 4 is a rear view schematically illustrating an appearance of a display apparatus according to Embodiment 2.

FIG. 4 is a rear view schematically illustrating an appearance of a display apparatus according to Embodiment 2. The configurations and operations other than configurations and operations which will be described below in particular are the same as those of Embodiment 1, and therefore will not be described for simplification. The bottom plate 21 of the backlight chassis 20 includes a long hole 230 which extends along one diagonal line as the separation part. The light source 24 is provided on one long side of the bottom plate 21.

According to the present embodiment, since the bottom plate 21 of the backlight chassis 20 has the separation part 230 which extends along one diagonal line, it is possible to respond to a display apparatus in which the light source 24 is provided on one long side of the bottom plate 21.

Further, according to the present embodiment, the backlight chassis 20 is provided on one long side, but may be provided on one short side.

Embodiment 3

Figure 5:
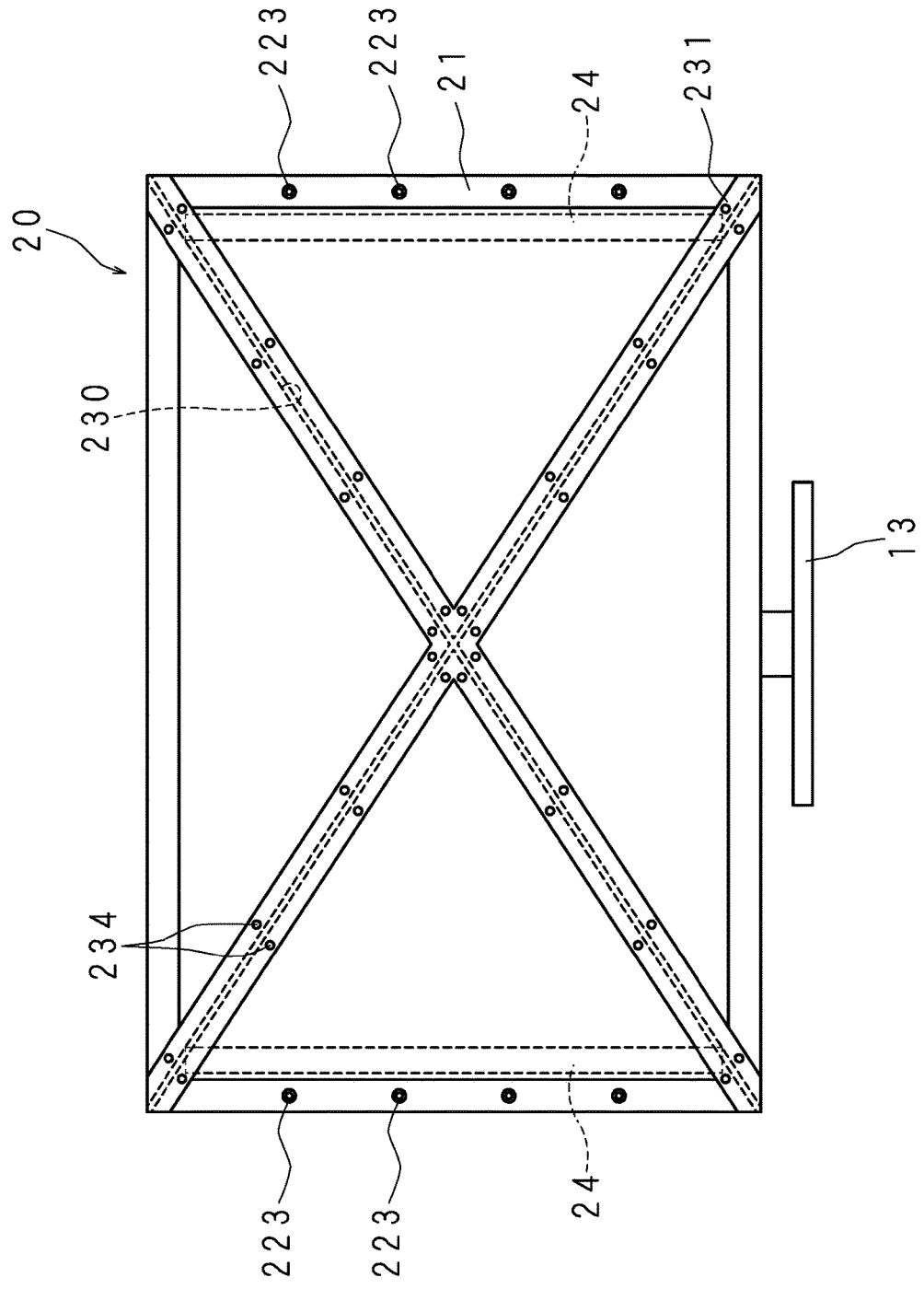
FIG. 5 is a rear view schematically illustrating an appearance of a display apparatus according to Embodiment 3.

FIG. 5 is a rear view schematically illustrating an appearance of a display apparatus according to Embodiment 3. The configurations and operations other than configurations and operations which will be described below in particular are the same as those of Embodiment 1, and therefore will not be described for simplification. The bottom plate 21 of the backlight chassis 20 includes separation parts 230 which extend along two diagonal lines.

The light sources 24 are fixed to both short sides of the bottom plate 21, while surfaces on which the LEDs are arranged ('LED arranged surfaces') face right and left side end faces of the light guide plate 25. The cover parts 231 are formed in an X shape in a side view.

Further, the light sources 24 according to the present embodiment are fixed to both short sides of the bottom plate 21 while the LED arranged surfaces face the right and left side end faces of the light guide plate 25, but light sources 24 may be fixed to both long sides of the bottom plate 21, while the LED arranged surfaces face upper and lower side end faces of the light guide plate 25.

According to the present embodiment, it is possible to respond to a display apparatus in which the light sources 24 face the right and left or the upper and lower side end faces of the light guide plate 25, and the light sources 24 are fixed to the right and left short sides of the bottom plate 21 or the upper and lower long sides thereof.

It is to be noted that, as used herein and in the appended claims, the singular forms "a", "an", and "the" include plural referents unless the context clearly dictates otherwise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A light-source device, comprising:
a light guide plate which is placed on a bottom plate of a housing having an opening formed in one surface of the housing; and
at least one light source which is fixed to the housing and is arranged to face one end face of the light guide plate,
wherein the bottom plate of the housing has a separation part formed in a long-hole shape that separates the bottom plate into a first portion in which the at least one light source is disposed and a second portion in which the at least one light source is not disposed,
further comprising:
a cover part which covers the separation part.

2. The light-source device according to claim 1, wherein
the bottom plate of the housing is formed in a rectangular shape,
the at least one light source is disposed on one of four sides of the bottom plate, and
the separation part is a long hole which extends in a direction along the one of the four sides of the bottom plate.

3. The light-source device according to claim 1, wherein
the bottom plate of the housing is formed in a rectangular shape,
the at least one light source is disposed on one of four sides of the bottom plate, and
the separation part is a long hole which extends along one of two diagonal lines of the bottom plate.

4. The light-source device according to claim 1, wherein
the bottom plate of the housing is formed in a rectangular shape,
two light-source groups are disposed on two opposing sides of the bottom plate, respectively,
each of the groups consists of the at least one light source, and
the bottom plate of the housing has two separation parts which are long holes and extend along two diagonal lines of the bottom plate, respectively.

5. The light-source device according to claim 1, wherein the cover part is fixed to the bottom plate of the housing.

6. The light-source device according to claim 5, further comprising:
a heat insulating member which is installed between the bottom plate of the housing and the cover part.

7. A display apparatus, comprising:
the light-source device according to claim 1; and
a display panel which covers the opening of the light-source device,
wherein light emitted from the at least one light source is irradiated to a rear surface of the display panel to display an image on a front surface of the display panel.

* * * * *